US012721365B1

(12) United States Patent
Grant et al.

(10) Patent No.: US 12,721,365 B1
(45) Date of Patent: Sep. 1, 2026

(54) FEED FORMULATION FOR AQUACULTURE SYSTEMS

(71) Applicant: Aqua Management Technologies, East London (CA)

(72) Inventors: Walter Lawrence Grant, Pretoria (CA); Andre Willem Bok, Hermanus (CA)

(73) Assignee: Aqua Management Technologies, East London (ZA)

( * ) Notice: Subject to any disclaimer, the term of this patent is extended or adjusted under 35 U.S.C. 154(b) by 0 days.

(21) Appl. No.: 19/387,106

(22) Filed: Nov. 12, 2025

(51) Int. Cl.

| | |
|---|---|
| ***A01K 61/10*** | (2017.01) |
| ***A01K 61/13*** | (2017.01) |
| ***A01K 63/04*** | (2006.01) |
| ***A23K 10/22*** | (2016.01) |
| ***A23K 10/26*** | (2016.01) |
| ***A23K 10/30*** | (2016.01) |
| ***A23K 20/20*** | (2016.01) |
| ***A23K 50/80*** | (2016.01) |

(52) U.S. Cl.
CPC .............. *A23K 20/20* (2016.05); *A01K 61/13* (2017.01); *A01K 63/045* (2013.01); *A23K 10/22* (2016.05); *A23K 10/26* (2016.05); *A23K 10/30* (2016.05); *A23K 50/80* (2016.05)

(58) Field of Classification Search
CPC ........ A01K 61/10; A01K 63/04; A01K 61/13; A23K 50/80; A23K 20/20
See application file for complete search history.

(56) References Cited

U.S. PATENT DOCUMENTS

2008/0260910 A1 * 10/2008 Pittman .................. A23K 20/28 426/624

FOREIGN PATENT DOCUMENTS

| | | | | |
|---|---|---|---|---|
| CN | 118000362 A | * | 5/2024 | ............. A23K 10/37 |
| KR | 100236263 B1 | * | 12/1999 | ............. A23K 10/30 |
| KR | 20000052237 A | * | 8/2000 | ............. C12N 1/205 |
| KR | 100398345 B1 | * | 9/2003 | ........... A23K 20/174 |
| WO | WO-9803260 A1 | * | 1/1998 | .............. A61P 39/00 |

OTHER PUBLICATIONS

Supplementation of Rice Husk Activated Charcoal in Feed and its effects on Growth and Histology of the Stomach and Intestines from Giant Trevally, Firdus et al., dated Feb. 15, 2021, 16pp.
Davidson, J., Good, C., Williams, C., & Summerfelt, S. T. (2017). “Evaluating the chronic effects of nitrate on the health and performance of post-smolt Atlantic salmon Salmo salar in freshwater recirculation aquaculture systems.” Aquacultural Engineering, 79(August), 1-8.
Davidson, J., Good, C., Welsh, C., Brazil, B., & Summerfelt, S. (2009). Heavy metal and waste metabolite accumulation and their potential effect on rainbow trout performance in a replicated water reuse system operated at low or high system flushing rates. Aquacultural Engineering, 41(2), 136-145.
Davidson, J., Good, C., Welsh, C., & Summerfelt, S. T. (2011). Abnormal swimming behavior and increased deformities in rainbow trout Oncorhynchus mykiss cultured in low exchange water recirculating aquaculture systems. Aquacultural Engineering, 45(3), 109-117.
Bjørgen, H., Koppang, E. O., & Nowak, B. F. (2025). Gill Health in Fish Farmed in Recirculating Aquaculture Systems (RAS): A Review. Journal of Fish Diseases, 48(3), 1-12.
Smith, B. J., Smith, S. A., & Pfeiffer, C. J. (2000). Effects of High-density Stocking in a Recirculating Aquaculture System on Gill Morphology ofHybrid Striped Bass (*Morone saxatilis* x *M. chrysops*). International Journal of Recirculating Aquaculture, 1(1).
Otnes, I. (2020). Histological investigation of gill health responses to recirculating aquaculture system (RAS) water quality in apparently healthy Atlantic salmon (*Salmo salar*). August.
Araújo-Luna, R., Ribeiro, L., Bergheim, A., & Pousão-Ferreira, P. (2018). The impact of different rearing condition on gilthead seabream welfare: Dissolved oxygen levels and stocking densities. Aquaculture Research, 49(12), 3845-3855.
Larsen, B. K., Skov, P. V., McKenzie, D. J., & Jokumsen, A. (2012). The effects of stocking density and low level sustained exercise on the energetic efficiency of rainbow trout (*Oncorhynchus mykiss*) reared at 19° C. Aquaculture, 324-325, 226-233.
McKenzie, D. J., Höglund, E., Dupont-Prinet, A., Larsen, B. K., Skov, P. V., Pedersen, P. B., & Jokumsen, A. (2012). Effects of stocking density and sustained aerobic exercise on growth, energetics and welfare of rainbow trout. Aquaculture, 338-341, 216-222).
Denis, W.; Folin, O. (1915). The Excretion of Free and Conjugated Phenols and Phenol Derivatives. Journal of Biological Chyemistry, 22, 309-320.
An essential amino acid for cell growth, cell repair and cell function). (Esumi, G. (2025). Why Is Tyrosine, More Abundant in Intracellular Proteins, Classified as a Non-Essential Amino Acid?: The Extracellular Demand Hypothesis; Ren, M., Liu, B., Habte-Tsion, H. M., Ge, X., Xie, J., Zhou, Q., Liang, H., Zhao, Z., & Pan, L. (2015). Dietary phenylalanine requirement and tyrosine replacement value for phenylalanine of juvenile blunt snout bream, Megalobrama amblycephala. Aquaculture, 442, 51-57.).

(Continued)

*Primary Examiner* — Monica L Perry
(74) *Attorney, Agent, or Firm* — Carter, DeLuca & Farrell LLP

(57) ABSTRACT

A method of reducing phenol in an Aquaculture System via regulating the feed includes: providing an aquatic environment including a captive area for cultured animals and consisting of either an aquaculture cage, pond or one or more of a filter for solid waste removal, a biofilter configured for ammonia remediation, an aeration system for regulating oxygen, and a filter for regulating carbon dioxide; introducing a granular activated carbon (GAC) into the feed of the cultured animal as a toxin binder at a rate of about 0.25% to about 3% of the protein content of the feed to adsorb phenol and one or more off-flavor compounds produced by the animals at least prior to or after excretion into the aquatic environment; and removing the GAC from the aquatic environment.

11 Claims, 3 Drawing Sheets

(56) References Cited

OTHER PUBLICATIONS

Drzewiecka, D. (2016). Significance and Roles of *Proteus* spp. Bacteria in Natural Environments. Microbial Ecology, 72(4), 741-758.; Ringø, E., Zhou, Z., Vecino, J. L. G., Wadsworth, S., Romero, J., Krogdahl, Olsen, R. E., Dimitroglou, A., Foey, A., Davies, S., Owen, M., Lauzon, H. L., Martinsen, L. L., De Schryver, P., Bossier, P., Sperstad, S., & Merrifield, D. L. (2016). Effect of dietary components on the gut microbiota of aquatic animals. A never-ending story? Aquaculture Nutrition, 22(2), 219-282.

Marine, N. R. G. (1999). Canadian water quality guidelines for the protection of aquatic life. Canadian Council of Ministers of the Environment, Winnipeg, 1-5.

Saha, N. C., Bhunia, F., & Kaviraj, A. (1999). Toxicity of phenol to fish and aquatic ecosystems. Bulletin of Environmental Contamination and Toxicology, 63(2), 195-202.

Moustafa, A. M., Aly, A.-E.-M. A., Mesalhy, S., Elghobashy, H. A., Hasanin, S. I., & Ibrahim, A. E. (2007). Influence of phenol pollution on Nile tilapia (*Oreochromis niloticus*.

Zwart, A., Arts, J. H. E., ten Berge, W. F., & Appelman, L. M. (1992). Alternative acute inhalation toxicity testing by determination of the concentration-time-mortality relationship: Experimental comparison with standard LC50 testing. Regulatory Toxicology and Pharmacology, 15(3), 278-290.

Hansch, C., McKarns, S. C., Smith, C. J., & Doolittle, D. J. (2000). Comparative QSAR evidence for a free-radical mechanism of phenol-induced toxicity. Chemico-Biological Interactions, 127(1), 61-72; Michałowicz, J., & Duda, W. (2007). Phenols—Sources and Toxicity. Polish Journal of Environmental Studies, 16(3).

Kroop, R. H. (1973). Treatment of phenolic aircraft paint stripping wastewater).

Kulkarni, Sunil J and Kaware, J. P. (2013). Review on research for removal of phenol from wastewater. International Journal of Scientific and Research Publications, 3(4), 1-5.

Petersen, M. A., Hyldig, G., Strobel, B. W., Henriksen, N. H., & Jørgensen, N. O. G. (2011). Chemical and sensory quantification of geosmin and 2-methylisoborneol in rainbow trout (*Oncorhynchus mykiss*) from recirculated aquacultures in relation to concentrations in basin water. Journal of Agricultural and Food Chemistry, 59(23), 12561-12568.

Genshiro Esumi (2024) Why is Tyrosine, More Abundant in Intracellular Proteins, Classified as a Non-Essential Amino Acid?: The Extracellular Demand Hypothesis, 12pp.

* cited by examiner

FEED FORMULATION FOR AQUACULTURE SYSTEMS

FIELD

The present disclosure relates to aquaculture and more particularly to a feed formulation configured to reduce the concentration of toxins in aquatic environments known to contribute to negative health effects in cultured ecosystems.

BACKGROUND

The "Density Effect" is a known phenomenon in aquaculture. In essence, as densities increase, a variety of negative effects can occur in cultured animals such as disease, poor feed efficiencies, slow growth rates, mortality, and possibly produce malformities. On the other hand, lower densities can decrease productivity and produce lower output. Several theories have been postulated as the cause for the Density Effect, but clear evidence of the causal mechanism has not been demonstrated as of yet.

One investigation by Davidson on the Density Effect was conducted in a series of experiments at the Freshwater Institute in West Virginia (Davidson, J., Good, C., Williams, C., & Summerfelt, S. T. (2017). "Evaluating the chronic effects of nitrate on the health and performance of post-smolt Atlantic salmon *Salmo salar* in freshwater recirculation aquaculture systems." *Aquacultural Engineering,* 79 (August), 1-8). The authors investigated various parameters that were hypothesized to cause these detrimental effects in the delicate ecosystem and copper (Cu) and nitrate (NO3-) were identified as contributing factors. It was found that high nitrate concentrations increased the mortality rate in the ecosystem but did not contribute to fin erosion which is a typical symptom of high densities. Moreover, increased copper concentrations also correlated with higher mortality rates but there was de minimis effect on growth rate between high and low copper concentrations (Davidson, J., Good, C., Welsh, C., Brazil, B., & Summerfelt, S. (2009). Heavy metal and waste metabolite accumulation and their potential effect on rainbow trout performance in a replicated water reuse system operated at low or high system flushing rates. *Aquacultural Engineering,* 41 (2), 136-145).

In a study where low water exchange rates were used, an increase in deformities were noted along with unusual animal behaviors such as fish swimming on their sides, fish yawning and gulping at the surface, as well as an increase in swimming speed of the fish. It was also noted that these symptoms increased with an increase in feed loading. (Davidson, J., Good, C., Welsh, C., & Summerfelt, S. T. (2011). Abnormal swimming behavior and increased deformities in rainbow trout *Oncorhynchus mykiss* cultured in low exchange water recirculating aquaculture systems. *Aquacultural Engineering,* 45 (3), 109-117).

In a review of "gill health" of the fish grown in recirculating aquaculture systems (RAS), several negative histological changes were noted such as epithelial hyperplasia and lamellar fusion. The poor quality of the water contributed to the number incidences and the severity of gill health. Moreover, an increase in the goblet cells, which are responsible for producing mucous in the gills, was also found in Recirculating Aquaculture Systems (RAS) which is an indicator that an irritant is present (or is formed) inducing such a physiological response (Bjørgen, H., Koppang, E. O., & Nowak, B. F. (2025). Gill Health in Fish Farmed in Recirculating Aquaculture Systems (RAS): A Review. *Journal of Fish Diseases,* 48 (3), 1-12). For example, Hybrid Striped Bass bred in a RAS system showed up to three quarters of their gill surface area became damaged after 8 months of cultivation. When these fish were moved to low density system the gill damage was reversed (Smith, B. J., Smith, S. A., & Pfeiffer, C. J. (2000). Effects of High-density Stocking in a Recirculating Aquaculture System on Gill Morphology of Hybrid Striped Bass (*Morone saxatilis* x *M. chrysops*). *International Journal of Recirculating Aquaculture,* 1 (1)). With Atlantic Salmon cultivated in a RAS system, it was found that the gill damage was dependent on both the amount of time in the RAS system and the Total Organic Carbon (TOC) in the system (Otnes, I. (2020). *Histological investigation of gill health responses to recirculating aquaculture system (RAS) water quality in apparently healthy Atlantic salmon (Salmo salar). August*).

Several studies have also shown that there is a negative correlation between growth rate and stocking density whilst also resulting in a higher Food Conversion Ratio (FCR) (Araújo-Luna, R., Ribeiro, L., Bergheim, A., & Pousão-Ferreira, P. (2018). The impact of different rearing condition on gilthead seabream welfare: Dissolved oxygen levels and stocking densities. *Aquaculture Research,* 49 (12), 3845-3855; Larsen, B. K., Skov, P. V., Mckenzie, D. J., & Jokumsen, A. (2012). The effects of stocking density and low level sustained exercise on the energetic efficiency of rainbow trout (*Oncorhynchus mykiss*) reared at 19° C. *Aquaculture,* 324-325, 226-233; and Mckenzie, D. J., Höglund, E., Dupont-Prinet, A., Larsen, B. K., Skov, P. V., Pedersen, P. B., & Jokumsen, A. (2012). Effects of stocking density and sustained aerobic exercise on growth, energetics and welfare of rainbow trout. *Aquaculture,* 338-341, 216-222).

Nearly a century ago it was discovered that phenol (C6H5OH) is excreted in the urine of mammals (Denis, W.; Folin, O. (1915). THE EXCRETION OF FREE AND CONJUGATED PHENOLS AND PHENOL DERIVATIVES. *Journal of Biological Chyemistry,* 22, 309-320). Investigations revealed that the source of this urinary phenol is the amino acid Tyrosine which is a non-essential amino acid but is important for producing neurotransmitters such as dopamine, norepinephrine and epinephrine. Tyrosine can also serve as a partial replacement for Phenylalanine (an essential amino acid for cell growth, cell repair and cell function). (Esumi, G. (2025). *Why Is Tyrosine, More Abundant in Intracellular Proteins, Classified as a Non-Essential Amino Acid?: The Extracellular Demand Hypothesis*; Ren, M., Liu, B., Habte-Tsion, H. M., Ge, X., Xie, J., Zhou, Q., Liang, H., Zhao, Z., & Pan, L. (2015). Dietary phenylalanine requirement and tyrosine replacement value for phenylalanine of juvenile blunt snout bream, *Megalobrama amblycephala. Aquaculture,* 442, 51-57.). It has been demonstrated that an increase in dietary Tyrosine causes an increase in urinary phenol (See FIGS. 1-1010). Conversely, inducing diarrhoea resulted in the disappearance of phenol in urine and constipation led to the opposite effect.

The following chemical reaction was proposed by the researchers Denis and Folin mentioned above:

| | |
|---|---|
| $C_6H_4$ OH $CH_2$ $CHNH_2$ COOH | (tyrosine) |
| $C_6H_4$ OH $CH_2$ COOH | ($p$ – oxyphenyl acetic acid) |
| $C_6H_4$ OH $CH_2 + CO_2$ | ($p$ – cresol + carbon dioxide) |
| $C_6H_4$ OH | ($p$ – oxybenzoic acid) |
| $C_6H_5$ OH + $CO_2$ | (phenol + carbon dioxide) |

It has been postulated in the medical literature that phenol produced through the metabolism of Tyrosine by bacteria plays a role in the causing colon cancer (Bone, E., Tamm, A., & Hill, M. (1976). The production of urinary phenols by gut bacteria and their possible ce: role in the causation of large bowel cancer. *The American Journal of Clinical Nutrition,* 29 (12), 1448-1454). Different species of bacteria including strains of *Escherichia coli, Streptococcus faecalis* (now *Enterococcus faecalis*), *Proteus* spp., and *Staphylococcus* all have the ability to produce phenol from tyrosine (Bone). Many of these microorganisms have been identified in the guts of aquatic organisms and, thus, it may be postulated or even inferred that the same concerns may be problematic in aquacultured animals (Drzewiecka, D. (2016). Significance and Roles of *Proteus* spp. Bacteria in Natural Environments. *Microbial Ecology,* 72 (4), 741-758.; Ringø, E., Zhou, Z., Vecino, J. L. G., Wadsworth, S., Romero, J., Krogdahl, Olsen, R. E., Dimitroglou, A., Foey, A., Davies, S., Owen, M., Lauzon, H. L., Martinsen, L. L., De Schryver, P., Bossier, P., Sperstad, S., & Merrifield, D. L. (2016). Effect of dietary components on the gut microbiota of aquatic animals. A never-ending story? *Aquaculture Nutrition,* 22 (2), 219-282).

It is known that the presence of phenol (even at low to moderate concentration levels) can be extremely toxic in Aquatic environments. For example, the Canadian guidelines for a safe level in freshwater lists 4 micrograms/litre (Marine, N. R. G. (1999). Canadian water quality guidelines for the protection of aquatic life. *Canadian Council of Ministers of the Environment, Winnipeg,* 1-5).

A study on Tilapia found the following symptoms caused by phenol: excess mucus secretion from the skin and gills, an initial increase in opercular movement, a loss of equilibrium and gulping at the surface. Fish eventually died of asphyxiation (Saha, N. C., Bhunia, F., & Kaviraj, A. (1999). Toxicity of phenol to fish and aquatic ecosystems. *Bulletin of Environmental Contamination and Toxicology,* 63 (2), 195-202). Fish exposed to less acute concentrations showed a reduced growth rate and an increase in feed conversion rate (FCR). There was also a loss of appetite. Researchers suggested that a safe concentration needs to be determined over a much longer period, they suggested 90 days (Saha).

An interesting phenomenon with phenol is the relationship with toxicity and salinity. Most toxic chemicals have greater toxic effects in soft freshwater. In a study on rainbow trout it was found that there was a 55% reduction in the LC 50 for trout in water with a salinity of 21 PSU versus freshwater (Brown et al., 1967). If this linear relationship holds the toxicity of phenol in sea water will be almost 4 times greater than in freshwater. In a further study, Tilapia were exposed to phenol for 12 weeks at a tenth of the 96 h LC 50 (often considered a safe level in toxicology (Yang, 2014)). However, it was found that the 2.5 mg/l concentration of phenol in fresh water caused a mortality rate of 8%. Symptoms included erosion of the fins and tail, pale gills and liver. Microscopically, it was clear that the gills of the fish were damaged (Moustafa, A. M., Aly, A.-E.-M. A., Mesalhy, S., Elghobashy, H. A., Hasanin, S. I., & Ibrahim, A. E. (2007). *Influence of phenol pollution on Nile tilapia* (*Oreochromis niloticus*)).

It was determined that an important concept in toxicology is the concentration time relationship. The safe concentration is lower at higher time periods. Determining this relationship has been estimated to require 20 concentration-time-mortality exposure combinations (Zwart, A., Arts, J. H. E., ten Berge, W. F., & Appelman, L. M. (1992). Alternative acute inhalation toxicity testing by determination of the concentration-time-mortality relationship: Experimental comparison with standard LC50 testing. *Regulatory Toxicology and Pharmacology,* 15 (3), 278-290). No such information could be found for aquacultured organisms and safe concentrations for grow-out (often longer than a year) are thus not known. Phenol toxicity is due to two inherent properties namely its hydrophobicity and its oxidative potential. Hydrophobicity can disrupt cell membranes, impairing animal functions and it can also generate Reactive Oxygen Species (ROS) which can further damage cells (Hansch, C., McKarns, S. C., Smith, C. J., & Doolittle, D. J. (2000). Comparative QSAR evidence for a free-radical mechanism of phenol-induced toxicity. *Chemico-Biological Interactions,* 127 (1), 61-72; Michałowicz, J., & Duda, W. (2007). Phenols—Sources and Toxicity. *Polish Journal of Environmental Studies,* 16 (3)).

Thus there exists a need to develop a process to reduce the presence and build-up of phenol in Aquaculture Systems and, a hitherto unrecognized metabolite, as a result, reduce the Density Effect to culture healthier animals and increase productivity.

SUMMARY

Provided in accordance with the present disclosure is a method of reducing phenol in an Aquaculture System via regulating the feed. The method includes: providing an aquatic environment including a captive area for cultured animals and one or more of a filter for solid waste removal from the cultured water, a biofilter configured for ammonia remediation, an aeration system for regulating oxygen, and a filter for regulating carbon dioxide from the cultured water; introducing a granular activated carbon (GAC) into the feed of the cultured animal as a toxin binder at a rate of about 0.25% to about 3% of the protein content of the feed to adsorb phenol produced by bacteria primarily in the animals gut prior to excretion into the aquatic environment; and removing the GAC via filtration or sedimentation from the aquatic environment. In aspects in accordance with the present disclosure, the method includes introducing GAC into the feed of the cultured animal as a toxin binder at a rate of about 2% of the protein content of the feed to adsorb one or more of phenol, other toxins and off flavor compounds produced by bacteria and the animals at least prior to or after excretion into the aquatic environment.

In aspects in accordance with the present disclosure, the method further includes monitoring the one or more off-flavor compounds of the cultured animal or the cultured water or the aquatic environment and adjusting the rate of the GAC to reduce the amount of the one or more off-flavor compounds. In other aspects in accordance with the present disclosure, the off-flavor compounds include at least one of geosmin or 2-methylisoborneol.

In aspects in accordance with the present disclosure, the method further comprises utilizing a GAC with a particle size of about 0.005 mm to about 0.50 mm to optimize the absorption of phenol by the GAC.

In aspects in accordance with the present disclosure, the GAC is manufactured from at least one of hard nuts, coal, wood, olive pits or coconuts.

In aspects in accordance with the present disclosure, the method further comprises monitoring the water quality of the cultured water of the aquatic environment and adjusting the rate of the GAC to clarify the water quality of the cultured water to a desired level for the aquatic environment. In other aspects in accordance with the present disclosure, the method further comprises correlating the water quality of the cultured water with an estimated amount of off-flavor compounds and adjusting the GAC to reduce the amount of the one or more off-flavor compounds.

In aspects in accordance with the present disclosure, the method further comprises removing the GAC through a filtration system.

In aspects in accordance with the present disclosure, the GAC adsorbs a majority of the one or more phenolic and off-flavor compounds in the guts of the cultured animals Provided in accordance with other aspects of the present disclosure is a feed for an aquaculture system which includes a base feed for a cultured aquatic environment containing animals, the base feed including one or more of protein, fat, and carbohydrate, fishmeal, fish oil, soybean, corn, wheat, barley, rice, peas, canola, cottonseed, and seaweed. A feed supplement is included made from granular activated carbon (GAC) and introduced into the base feed at a rate of about 0.25% to about 3% of the protein content of the base feed. In aspects in accordance with the present disclosure, GAC is introduced into the feed of the cultured animal as a toxin binder at a rate of about 2% of the protein content of the base feed to adsorb the phenol produced by the animals prior to excretion into the aquaculture environment.

In aspects in accordance with the present disclosure, the aquaculture system includes one or monitors or sensors configured to monitor or sample testing one or more of phenol and off-flavor compounds of the animals of the aquaculture system or the water or the aquatic environment and adjust the rate of the GAC into the base feed to reduce the amount of phenol excreted into the aquaculture environment. In other aspects in accordance with the present disclosure, the one or more compounds include at least one of geosmin or 2-methylisoborneol.

In aspects in accordance with the present disclosure, the GAC has a particle size of about 0.005 mm to about 0.50 mm to optimize the absorption of phenol by the GAC.

In aspects in accordance with the present disclosure, the GAC is manufactured from at least one of hard nuts, coal, wood, olive pits or coconuts.

BRIEF DESCRIPTION OF THE DRAWINGS

The above and other aspects and features of the present disclosure will become more apparent in view of the following detailed description when taken in conjunction with the accompanying drawings wherein like reference numerals identify similar or identical elements.

DETAILED DESCRIPTION

Example embodiments will now be described more fully with reference to the accompanying drawings and with reference to FIGS. 1-3. As mentioned above, a previously unidentified metabolite was discovered to be a leading cause of the Density Effect in Aquaculture. The metabolite, phenol, is produced via the metabolic transformation of the amino acid Tyrosine by several bacterial species (See FIGS. 1-1010). Phenol is toxic even at low concentrations and toxicological studies have demonstrated a similar symptom profile to the density effect. High concentrations of phenol were measured in intensive RAS (up to 0.37 mg/l) systems confirming the accumulation of phenol in such systems.

Figures 1, 2:
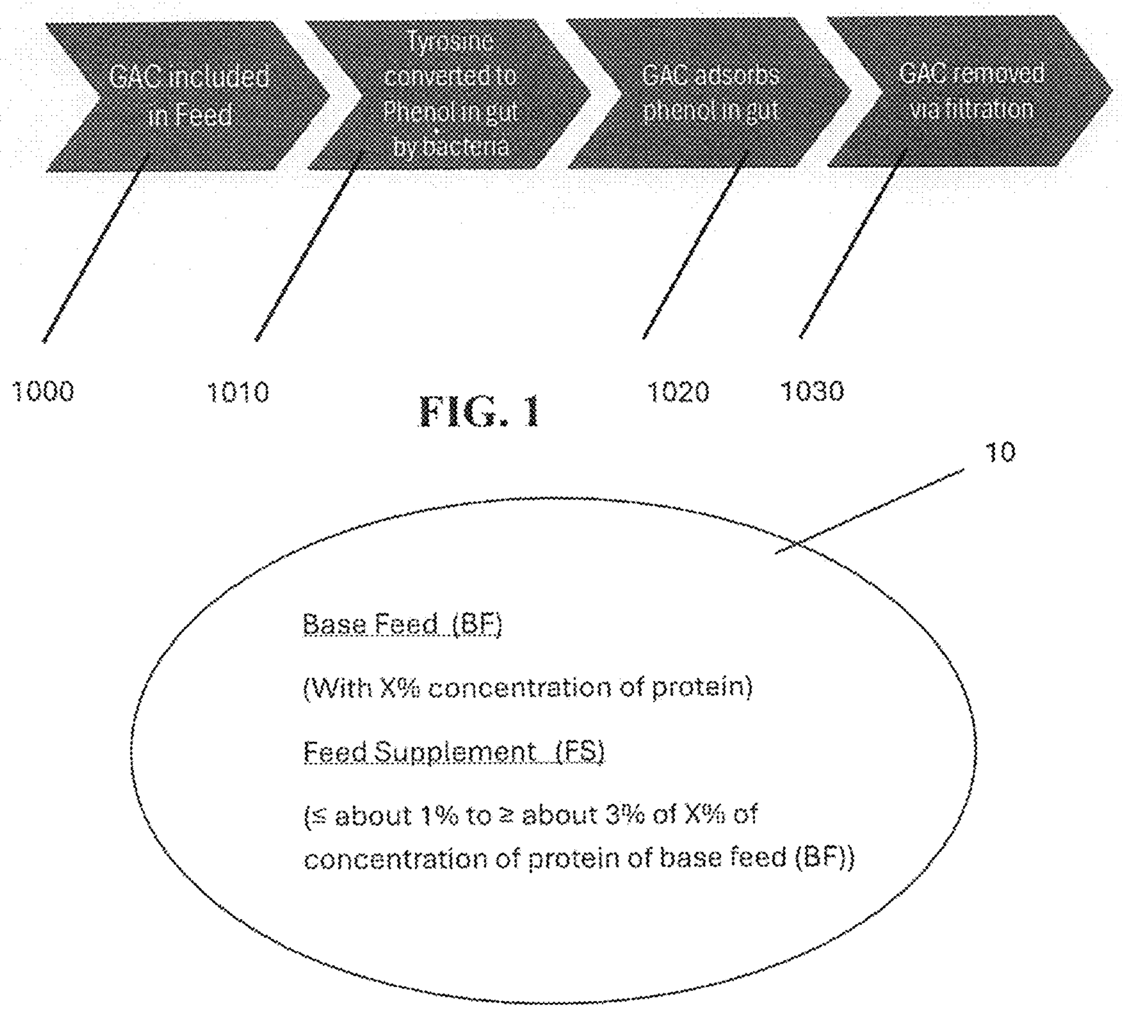
FIG. 1 is a flow chart showing a method of reducing toxins in an Aquaculture System via feed regulation.
FIG. 2 is a schematic diagram of a pellet of base feed infused with a feed supplement.

With respect to the present disclosure, it has been found that introducing a feed supplement (FS) such as Granular Activated Carbon (GAC) as a toxin binder at a rate of about 1% to about 3% of the protein content of the base feed (BF) can significantly reduce the accumulation of phenol (See FIG. 1-step 1000). In embodiments, introducing GAC as a toxin binder at a rate of about 2% of the protein content of the base feed (BF) can significantly prevent the accumulation of phenol and existing levels can be significantly reduced (e.g., phenol levels reduced from 0.37 mg/l to <0.001 mg/l in the same RAS system). In other embodiments, it is envisioned that any type of GAC may be utilized based on coal, hard nuts, coconut or pulp and is dependent on the pore or micro-pore structure that is warranted. Further, other types of natural or synthetic binders may be employed for similar purposes, e.g., bentonite, ion exchange resins. GAC includes the added benefit of forming into a solid pellet 10 with a below average moisture content for better storage. The FS may be mixed with the BF to form pellets 10 for feeding, the FS may be infused with each pellet 10 of the base feed BF to supplement each pellet 10, or the FS may be introduced independently of the BF and into the feeding system (See FIGS. 1-1000).

Additional benefits of introducing GAC at a strategic rate (e.g., about 2% of the protein content as described below) also has additional benefits, i.e., increased water clarity as well as a reduction in the build-up of so called "off-flavor compounds" (e.g., Geosmin and 2-methylisoborneol) in both the flesh and in the water of the Aquaculture system. For example, it has been determined that this strategy of introducing GAC at the given rate produced a reduction in Geosmin levels in the flesh of the fish from an average of 379.6 ng/kg to 159 ng/kg after a month. Moreover, the levels of the Geosmin in the culture water greatly reduced from 11.98 ng/l to 0.70 ng/l after three months, while also reducing 2-methylisoborneol in the flesh (e.g., from 12.55 ng/l to 6.36 ng/1) and 2-methylisoborneol levels in the culture water from 3.92 to 0.37 ng/l after a month.

Moreover, strategically correlating the amount of GAC based on the percentage of protein allows the feed to be tailored to different species of animal and different animal life stages. For example, feed for juvenile fish tends to include a higher percentage of protein than adult fish thereby requiring more GAC. Introducing varying amounts of GAC at a strategic rate depending on animal life cycle facilitates management of the aquatic system, increases water quality, and helps reduce the build-up of off-flavor compounds.

Even though other methods of removing phenol from wastewater are known, the introduction of GAC has been found to be the most effective and the most economical. The adsorptive capacity for phenols was determined to be about 0.404 gram phenol/gram of GAC (Kroop, R. H. (1973). *Treatment of phenolic aircraft paint stripping wastewater*) (See FIGS. 1-1020). This adsorption was found to decrease with an increasing pH and a very effective pH was found to be about 5. Particle sizes (or pore size in some instances) for GAC may be in the range of about 0.005 mm to about 0.50 mm to be effective. A well suited particle size was found to be about 0.420 mm and the one of the most effective sources of activated carbon was from those produced from hard nuts (Kulkarni, Sunil J and Kaware, J. P. (2013). Review on research for removal of phenol from wastewater. *International Journal of Scientific and Research Publications,* 3 (4), 1-5).

The Density Effect is particularly pronounced in intensive marine RAS systems which failed to recognize the causative agent of the Density Effect. Various solutions such as ozonation and removal through a carbon filter proved insufficient, partly due to the short turn over times and low concentrations inherent in commercial RAS systems.

Identifying this metabolite as a primary cause of Density Effect in these systems led to the discovery of properly dosing a GAC in the system via the base feed to mitigate this issue (See FIGS. 1-1000). Due to the fact that the causative agent is the amino acid Tyrosine, the GAC can be accurately dosed by including the GAC in the base feed at the appropriate concentration. Fortunately, the physio-chemical conditions in the digestive tract are ideal for adsorption (See FIGS. 1-1010). Based both off theoretical (the level of the amino acid Tyrosine in aquaculture diets) and empirical findings a concentration of 0.9% GAC (from a hard nut) for a diet with a 45% protein content was sufficient to reduce the phenol concentration in the RAS from 0.37 mg/l to <0.001 mg/l (See FIGS. 1-1010). Thus, a dosage of about 0.25% to about 3% of the protein content of the base feed and, in particular, about 2% of the protein content of the base feed, was found to work very well as the source of the toxins is directly proportional to the protein content (See FIGS. 1-1020).

The new feed rate with GAC into the RAS was found to counteract, neutralize or even reverse incidences of decreased growth, increased FCR, poor feeding response post handling, increased mortality, decreased appetite, fin damage, gasping, and coughing fish with excessive mucus. These symptoms effectively become nominal with the long-term use of a base feed with GAC included in the diet.

Experimental data has produced long term growth for a variety of species in RAS systems using the presently-disclosed feeding system. For example:

- Yellowtail Kingfish (*Seriola lalandi*), was grown from egg to 2 kg in 14 months with a Feed Conversion Ratio (FCR) of 1.3:1;
- Dusky Kob (*Argyrosomus japonicus*) was grown from egg to 1 kg in 14 months with an FCR of 1.1:1; and
- Rainbow Trout (*Oncorhynchus mykiss*) growth trials produced at 2-Dams RAS Trout Farm achieved an FCR of at under 1.1:1

Additional benefits from the presently-disclosed feeding system include:

- Substantial elimination of phenol from the aquatic system (i.e., the reduction of Phenol to highly negligible, trace amounts);
- Off-Flavor Reduction—The reduction of off-flavor compounds Geosmin and 2-Methylisoborneol (2-MIB) to negligible levels;
- Disease resistance—Better feed digestibility results in less organic material available for pathogenic bacteria (like *Vibrio* sp.) to feed on, reducing any probability of infection;
- Handling stress—The improved water quality has improved the ability of fish to cope with physical handling;
- Ammonia, Oxygen and Carbon dioxide—Better feed digestibility results in less waste, lower ammonia levels, less bacterial activity, lower oxygen demand and less carbon dioxide production in the system;
- Growth—Enhanced water quality results in superior animal productivity;
- Colour—Healthy fish are bright in colour, i.e., an improvement in the physical appearance of the fish is noticeable; and
- Economics—Improved animal health decreases the production cost per kilogram (kg) of fish produced due to an increase in feed efficiency in the same system.
- Environment—In cage culture, less toxins will be released highlighting the unrecognized influence that phenol has on the environment.

A major issue in RAS systems is the accumulation of off-flavors due to the buildup of geosmin and 2-methylisoborneol. Geosmin is a sesquiterpenoid (a terpene derivative with 15 carbon atoms). It has a strong “earthy/mouldy/muddy” odour. 2-Methylisoborneol (2-MIB) is a monoterpene alcohol and its odour is often described as “musty”, “wet soil”, or “mossy”.

These organic compounds can be the primary causes of off-flavor in fish raised in aquaculture systems, e.g., RAS systems. The compounds are absorbed by fish (mainly via gills), accumulate in fatty tissues, and give fish a muddy, unpleasant flavor. These compounds can be detected by humans at extremely low levels, e.g., 10 ng/l in water and 75 to 550 ng/kg in fish flesh.

When culture water has a geosmin concentration of about 10 ng/l (or greater), the flavor in the fish flesh will reach commercially unacceptable levels (Petersen, M. A., Hyldig, G., Strobel, B. W., Henriksen, N. H., & Jørgensen, N. O. G. (2011). Chemical and sensory quantification of geosmin and 2-methylisoborneol in rainbow trout (*Oncorhynchus mykiss*) from recirculated aquacultures in relation to concentrations in basin water. *Journal of Agricultural and Food Chemistry,* 59 (23), 12561-12568). Off-flavor may cause product rejection, harvest delays and increased costs for depuration (purging) in clean water. Monitoring of geosmin concentrations requires advanced techniques (e.g. GC-MS, sensory panels) which are expensive to implement and maintain. These compounds can also cause issues with drinking water.

A trial was conducted in a RAS system to test the ability of the present disclosure to reduce off-flavor in a RAS production system (e.g., one with notoriously bad off-flavor problems). The trial was set up using Rainbow Trout in a simple RAS system design.

The results of the introduction of GAC as specified into the feed fed to the fish in the in the RAS system was found to counteract, neutralize or even reverse incidences off-flavor. More particularly, the present disclosure reduced the off-flavor compounds to near-negligible background levels in the fish flesh within the first 6 weeks and in the water within 3 months. Table 1 below shows the 2-MIB and geosmin reduction average in the fish (solid) and the system water (liquid) over the period in this summary of the results:

TABLE 1

| Date of Sampling | 16 Sep. 2024 | 15 Oct. 2024 | 10 Dec. 2024 |
|---|---|---|---|
| Time of Sampling | 16h00pm | 15h00pm | 9h30am |
| Date of Receipt | 18 Sep. 2024 | 17 Oct. 2024 | 13 Dec. 2024 |
| Time of Receipt | 10h00am | 10h03 | 11h50am |
| Matrix | Solid | Solid | Solid |
| 2-MIB (ng/kg) | 12.55 | 6.36 | 6.36 |
| Geosmin (ng/kg) | 379.74 | 158.96 | 180.60 |
| IPMP (Surr) % | 89.13 | 95.68 | 116.30 |
| Geosmin (ng/kg) | 426.06 | 166.13 | 155.29 |
| Matrix | Liquid | Liquid | Liquid |
| 2-MIB (ng/l) | 3.92 | 0.37 | 0.37 |
| Geosmin (ng/l) | 11.98 | 4.02 | 0.70 |

TABLE 1-continued

| | | | |
|---|---|---|---|
| IPMP (Surr) % | 94.17 | 91.85 | 92.00 |
| Geosmin (ng/l) | 12.73 | 4.37 | 0.76 |

The above summary Table 1 of various Analytical Reports demonstrates the reduction in geosmin levels in the flesh of the fish from an average of 379.6 ng/kg to 159 ng/kg after a month and the levels in the culture water from 11.98 ng/1 to 0.70 ng/l after three months, while it reduced 2-methyl-isoborneol (2-MIB) from 12.55 ng/kg to 6.36 ng/kg in the flesh and levels in the culture water from 3.92 to 0.37 ng/1 after a month. These levels are considered below detectable limits for humans after a month and were even lower after 3 months.

Samples of fish flesh from growth trials utilizing the present disclosure were also analysed for the presence of off-flavor compounds, with undetectable levels of geosmin and 2-MIB present.

When utilizing the present disclosure in a RAS system, water clarity also dramatically improves. For example, phenol is at least partly responsible for the browning of water in intensive aquaculture systems. Tyrosinase is also known for the browning of fruits and is caused when the enzyme catalyses phenol and causes oxidation producing catechols and certain dehydrogenation producing quinones. Quinones are unstable in water and produces brownish insoluble polymers. All of these various enzymes contribute to deteriorating water quality in an RAS system.

In aspects of the present disclosure, the off-flavor compounds may be actively measured (e.g., via testing or sensors) and the rate of the GAC may be adjusted to reduce one or more of the same. This, however, tends to place a large dependence on high quality and expensive equipment or advanced techniques (e.g. GC-MS, sensory panels) which may be difficult to implement and maintain.

The water clarity or water quality may also be monitored (via sensor S) and the rate of the GAC may be adjusted to clarify the water which is directly proportional to the concentration of some off-flavor compounds. In embodiments, the change in water clarity may be measured and the increase or reduction of off-flavor compounds may be extrapolated therefrom to reduce the dependence on high quality and expensive equipment or advanced techniques (e.g. GC-MS, sensory panels) which may be difficult to implement and maintain.

With the strategic introduction of GAC into the RAS system based on the percentage of the protein in the base feed, there is less monitoring required and the improvement in overall health and better FCR of the animals increases over time. Moreover, once adsorbed by the fish in the gut and excreted into the pond or aquaculture system, the GAC may be easily removed using known filtration techniques. (See FIGS. 1-1030) This is especially pronounced when a bioenergetic model is used to feed fish at the appropriate rate. The oxygen consumption of the RAS system decreases as well as a lowering of the amount of carbon dioxide concentration which is due to less nutrients being available for bacteria in these systems.

Figure 3:
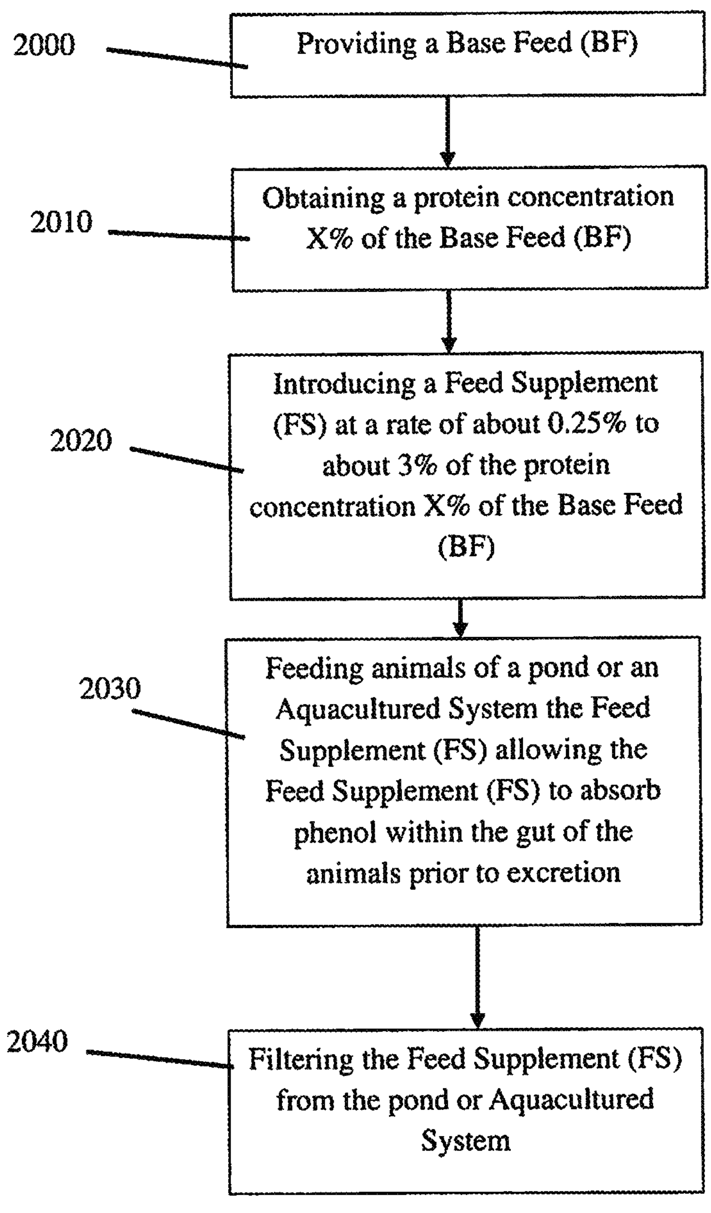
FIG. 3 is a flow chart of a process for introducing the feed supplement into a base feed for a pond or Aquaculture System.

FIG. 3 shows one embodiment of a method 2000 for reducing phenol and off-flavor compounds from a pond or Aquaculture system. More particularly, in step 2000 a base feed is provided. The protein of the bases feed is determined 2010 and a feed supplement FS (e.g., GAC) is introduced from about 0.25% to about 3% of the protein concentration of the base feed—step 2020. Feeding the animals the base feed and feed supplement FS and allowing the feed supplement to adsorb the phenol in the gut of the animal prior to excretion-step 2030. Filtering out the GAC from the pond or aquatic environment—step 2040.

Figure 4:
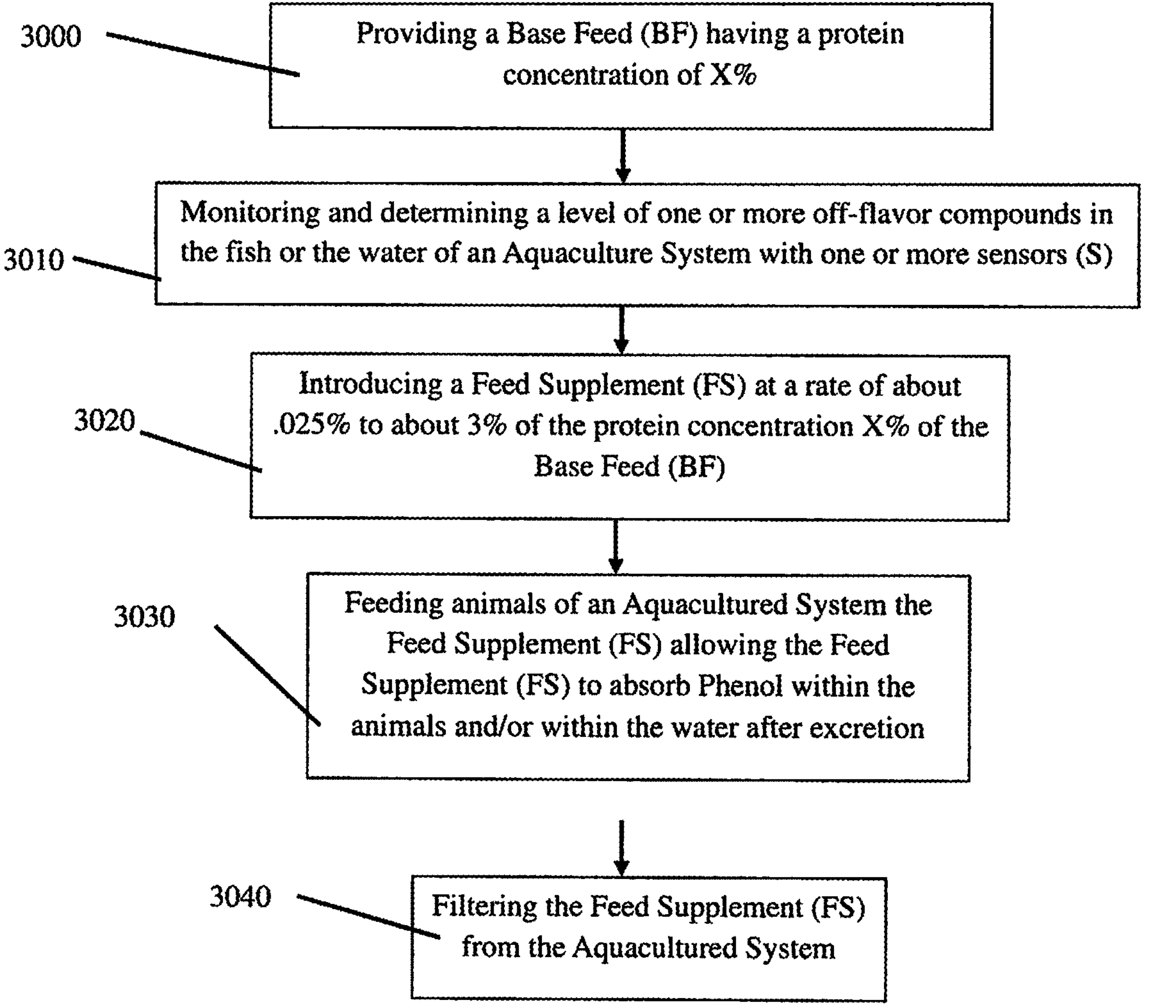
FIG. 4 is a flow chart of a process for introducing the feed supplement into a base feed for a pond or Aquaculture System based on an output from one or more sensors or test procedures.

FIG. 4 shows one embodiment of a method 3000 for monitoring and reducing phenol and off-flavor compounds from a pond or Aquaculture system. More particularly, in step 3000 a base feed is provided. The water is testeds or monitored to determine a level of off-flavor compounds and/or phenol in the pond or aquaculture system—step 3010. The protein of the bases feed is determined 3010 and a feed supplement FS (e.g., GAC) is introduced from about 0.25% to about 3% of the protein concentration of the base feed—step 3020. Feeding the animals the base feed and feed supplement FS and allowing the feed supplement to adsorb the phenol in the gut of the animal prior to excretion—step 3030. Filtering out the GAC from the pond or aquatic environment—step 3040. The water in the pond or system may be monitored or tested to adjust the FS in the base feed as needed.

While several aspects of the disclosure have been described, it is not intended that the disclosure be limited thereto, as it is intended that the disclosure be as broad in scope as the art will allow and that the specification be read likewise. Therefore, the above description should not be construed as limiting, but merely as exemplifications of particular aspects. Those skilled in the art will envision other modifications within the scope and spirit of the claims appended hereto.

What is claimed:

1. A method of reducing phenol in an aquaculture system via regulating the feed, the method comprising:

providing an aquatic environment including a captive area for cultured animals and one or more of a filter for solid waste removal from the cultured water, a biofilter configured for ammonia remediation, an aeration system for regulating oxygen, and a filter for regulating carbon dioxide from the cultured water;

introducing a granular activated carbon (GAC) into the feed of the cultured animal as a toxin binder at a rate of about 0.025% to about 3% of the protein content of the feed to adsorb a substantial amount of the phenol produced by bacteria in the gut of the animals prior to excretion into the aquatic environment; and removing the GAC via filtration or sedimentation from the cultured water of the aquatic environment.

2. The method according to claim 1, wherein the GAC is introduced into the feed at a rate of about 2% of the protein content of the feed.

3. The method according to claim 1, wherein the method further comprises monitoring phenol and one or more off-flavor compounds of the cultured animal or the cultured water or the aquatic environment and adjusting the rate of the GAC into the feed to reduce at least one of the phenol or one or more off-flavor compounds.

4. The method according to claim 3, wherein the one or more off-flavor compounds includes at least one of geosmin or 2-methylisoborneol.

5. The method according to claim 1, wherein the method further comprises utilizing a GAC with a particle size of about 0.005 mm to about 0.50 mm.

6. The method according to claim 1, wherein the GAC is manufactured from at least one of hard nuts, coal, wood, olive pits or coconuts.

7. The method according to claim 1, wherein the method further comprises monitoring the water quality of the cultured water of the aquatic environment and adjusting the rate of the GAC into the feed to clarify the water quality of the cultured water to a desired level for the aquatic environment.

8. The method according to claim 7, further comprising correlating the water quality of the cultured water with an estimated amount of at least one of the phenol or one or more off-flavor compounds and adjusting the rate of the GAC into the feed to reduce the amount of at least one of the phenol or one or more off-flavor compounds excreted into the aquatic environment.

9. The method according to claim 8, wherein the one or more off-flavor compounds includes at least one of geosmin or 2-methylisoborneol.

10. The method according to claim 1, further comprising removing the GAC through a filtration system.

11. The method according to claim 1, wherein the GAC adsorbs the phenol and one or more off-flavor compounds in the gut of each cultured animal.

* * * * *